United States Patent [19]
Kendall et al.

[11] 3,854,176
[45] Dec. 17, 1974

[54] HIGH CAPACITY GEOMETRICALLY-FAVORABLE SOLVENT EXTRACTION COLUMNS FOR PROCESSING FISSILE MATERIALS

[75] Inventors: Jack B. Kendall, Williston, S.C.; James H. Nordahl, Richland, Wash.

[73] Assignee: Atlantic Richfield Company, Philadelphia, Pa.

[22] Filed: Sept. 29, 1971

[21] Appl. No.: 184,709

[52] U.S. Cl.............. 23/267 C, 23/270.5, 423/8, 252/301.1 R
[51] Int. Cl............................................ B01d 11/04
[58] Field of Search....... 23/267 C, 269, 270.5, 309, 23/310, 312 ME; 423/8, 9, 10; 252/301.1 R

[56] References Cited
UNITED STATES PATENTS

| | | | |
|---|---|---|---|
| 3,510,399 | 5/1970 | Terasawa | 176/22 |
| 2,742,348 | 4/1956 | Spence | 23/270.5 |
| 3,378,450 | 4/1968 | Gramer | 176/22 |
| 2,474,007 | 6/1949 | Maycock | 23/270.5 |
| 3,179,501 | 4/1965 | Duckworth | 23/270.5 |
| 2,988,429 | 6/1961 | Cooley | 23/270.5 |
| 2,847,283 | 8/1958 | Figg | 23/270.5 |
| 3,285,705 | 11/1966 | Zuiderwigg | 23/270.5 |
| 3,254,048 | 5/1966 | Schaub | 23/270.5 |
| 3,108,859 | 10/1963 | Kospi | 23/270.5 |
| 3,393,055 | 7/1968 | Stevenson | 23/270.5 |
| 2,705,594 | 4/1955 | Brewer | 23/269 |

Primary Examiner—Norman Yudkoff
Assistant Examiner—S. J. Emery
Attorney, Agent, or Firm—John R. Ewbank

[57] ABSTRACT

This disclosure describes a high-capacity pulsed solvent extraction column for processing fissile materials having a potential of causing a nuclear criticality reaction.

5 Claims, 3 Drawing Figures

PATENTED DEC 17 1974

INVENTORS
JACK B. KENDALL
JAMES W. NORDAHL

*Michael B. Fein*
ATTORNEY

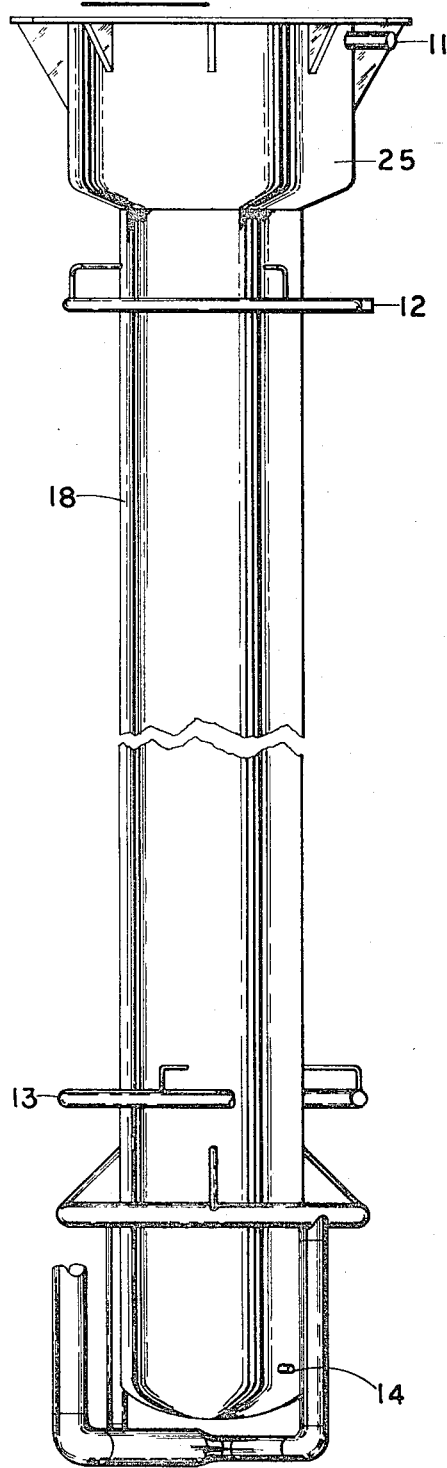
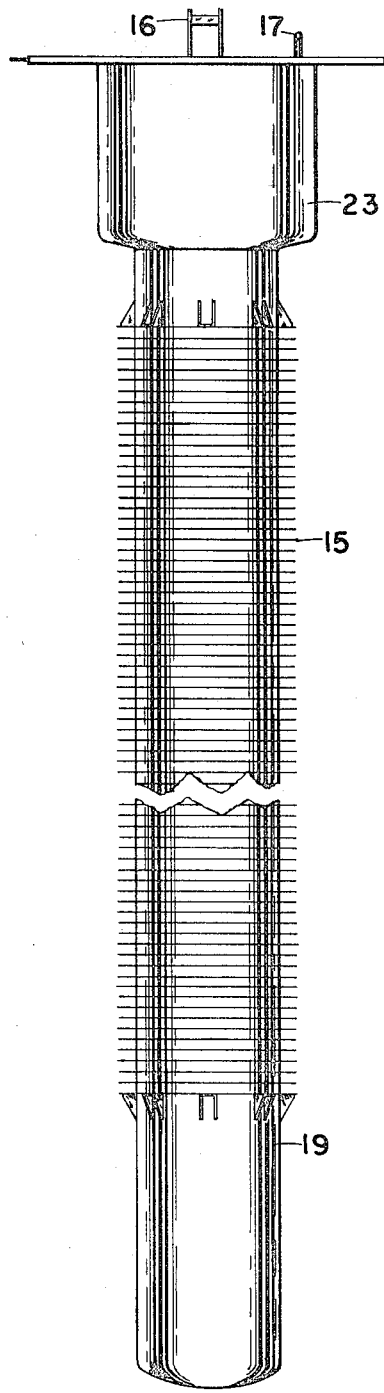

HIGH CAPACITY GEOMETRICALLY-FAVORABLE SOLVENT EXTRACTION COLUMNS FOR PROCESSING FISSILE MATERIALS

BACKGROUND OF THE INVENTION

1. Field of the Invention

This invention relates to a novel apparatus in the solvent extraction processing of fissile materials.

2. Description of the Prior Art

In the processing of fissile nuclear fuels, many processes include the separation of uranium, plutonium, and/or fission product values by means of solvent extraction consisting of bringing two substantially immiscible liquids into intimate contact, one liquid being an aqueous phase and the other liquid being an organic phase. During the contact between the liquids, certain values in one of the liquids will diffuse across the interface into the other liquid thereby bringing about a separation of these diffused values from other values remaining in the first mentioned liquid.

In the prior art, one means of providing the intimate contact of the immiscible liquids is by introducing the organic and the aqueous phases at opposite ends of an elongated vertical solvent extraction column as it is known in the art resulting in countercurrent flow of the two phases. To promote contact of the immiscible liquids and reduce the length of the solvent extraction column it is necessary to increase the area of interfacial contact between the aqueous and organic liquids. This is done by employing an array of packing, baffles or sieve plates placed along the length of the column so as to increase the turbulence of the co-mingling liquids. For a given design of the internal packing, baffles or sieve plates, the column throughput capacity is increased by increasing the cross-sectional area of the column.

With larger scale reprocessing plants now being built, artisans have been seeking ways to increase the capacity of solvent extraction columns while avoiding the problem of nuclear criticality. For instance, mathematical calculations show that merely increasing the cross-sectional area of a column by increasing the cross-sectional area of a column by increasing its diameter is frequently unsafe due to possibility of nuclear criticality taking place. Previous methods of achieving high capacity in the solvent extraction of fissile materials while maintaining the column subcritical included use of multiple columns and/or nuclear poisons.

SUMMARY OF THE INVENTION

It is therefore an object of this invention to provide a solvent extraction column for processing fissile materials which has substantially increased capacity while avoiding the possibility of nuclear criticality by means of favorable geometry rather than by multiple columns or nuclear poisons. Favorable geometry maintains the system subcritical by virtue of neutron leakage under the worst foreseeable process conditions.

This and other objects as will become apparent from the following specification are achieved by the apparatus of this invention which is a solvent extraction column for processing fissile materials having an annular column processing section, means for inducing intimate contact between a plurality of liquid phases, and annular disengaging section or sections.

By providing such an annular column processing section and annular disengaging sections, the solvent extraction column may be made to be geometrically favorable and with high processing capacity without risking the possibility of a nuclear criticality.

BRIEF DESCRIPTION OF THE DRAWINGS

FIG. 2 is an elevational view of the column.

FIG. 3 is an elevational view of the cartridge assembly.

DETAILED DESCRIPTION OF THE DRAWINGS AND PREFERRED EMBODIMENTS

Figure 1:
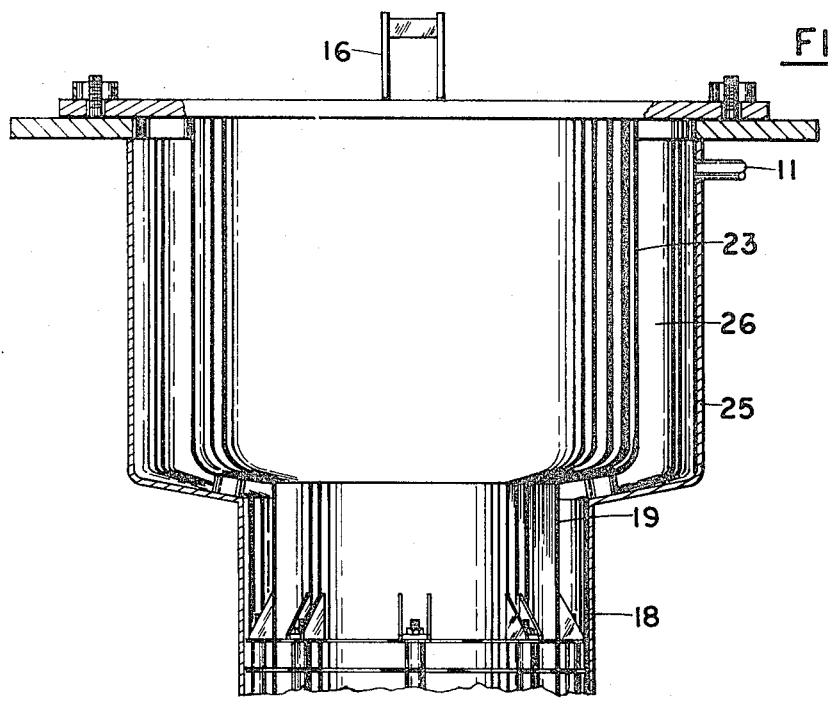
FIG. 1 is an elevational view of the column assembly with the external cylinder shown in section.
Figure 1:
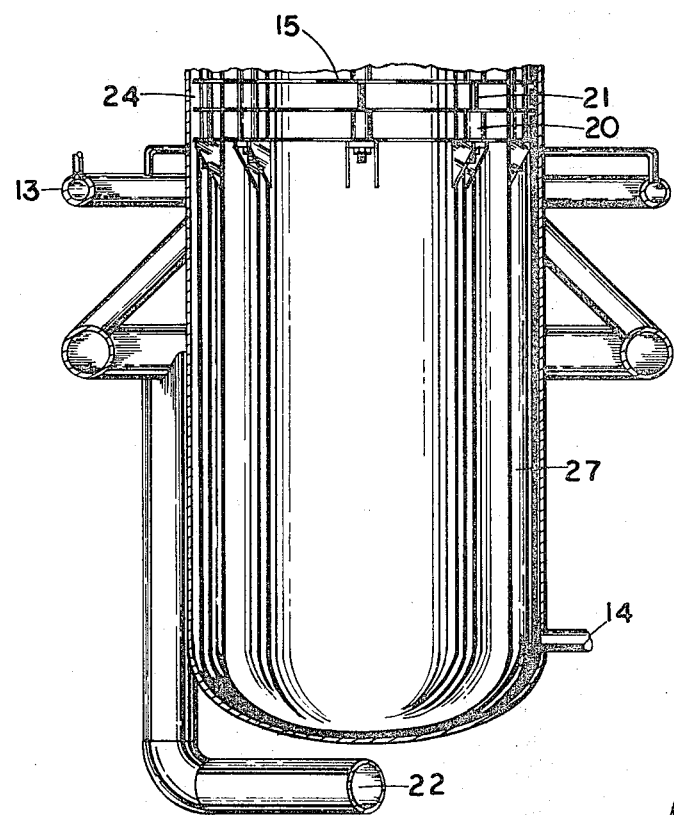

Referring to FIGS. 1, 2, and 3, an external cylinder 18 is provided having a distributor 13 wherein light liquid, usually organic, is introduced into the processing section 24 which is the annular column defined by the internal cylinder 19 and the external cylinder 18. A distributor 12 is provided wherein the heavy liquid, usually aqueous, is introduced into said processing section. Distributors 12 and 13 are arranged at opposite ends of a series of horizontal sieve plates 15 which may have holes, perforations, slits, or any other arrangement of openings to facilitate various degrees of contacting of the two immiscible phases. Means are provided for introducing a pulse of a selected frequency and amplitude through the pulse leg 22 so as to achieve optimum interfacial contact between the immiscible liquids.

The following description refers to a column operated with a top interface and the heavy phase continuous as known in the art. On the upstroke of the pulse the layer of light phase liquid usually organic that has collected under each annular plate 15 is jetted through the openings in the plate 15 and forms droplets within the heavy phase liquid, usually aqueous, that has collected above the plate. At the same time the jets of light phase induce swirling and mixing in the heavy phase. As this upward motion ceases and is reversed, the light phase droplets rise toward a new layer of light phase liquid forming under each plate. On the downstroke the heavy phase flows through the openings in the plates 15 to the section below.

The annular plates 15 are preferably held in place on the internal cylinder by means of tierods 21 and spacers 20 forming the cartridge assembly. If different plates are desired the tierods may be removed and the plates changed by lifting the cartridge assembly out of the external cylinder which provides access to the plates. Lifting fixtures 16 may be provided to facilitate the removal of the internal cartridge assembly.

Heavy liquid is removed at outlet 14 near the bottom of the processing section 24 and below the series of plates 15. Annular disengaging sections 26 and 27 are provided to prevent nuclear criticality by means of favorable geometry. The annular disengaging sections are spacially defined by boundaries 23 and 25 for disengaging section 26 and by boundaries 18 and 19 for disengaging section 27.

The internal cylinder 19 can be empty or filled with neutron absorbing or moderating material (not shown). Suitable materials include water, solutions of cadmium, boron, gadolinium, and the like in water or other liquid. Solid neutron absorbing or moderating materials such as polyethylene, carbon or concrete can also be used and, depending on the requirements of the situation, may be more preferred or less preferred. When a liquid is used, it is advantageous to impose a hydrostatic head on the internal cylinder via the piping connection 17. The hydrostatic head insures that in the event of a leak in the internal cylinder for any reason, the liquid neutron absorbing or moderating material will flow into the annular processing section 24 rather than the material in the processing section flowing into the internal cylinder. In this way, a nuclear criticality is prevented due to leakage of fissile material into the internal cylinder 19.

The internal and external cylinders and annular plates are constructed of suitable materials for nuclear environments such as stainless steel.

The following example is presented to illustrate in conjunction with the drawings a nonlimiting embodiment of the invention:

EXAMPLE

A pulsed solvent extraction column as shown in FIGS. 1, 2, and 3 is provided with internal and external cylinder diameters of 24 and 30 inches, respectively, resulting in an annulus width of 3 inches. Eighty-five sieve plates are provided spaced four inches apart.

An organic feed containing uranium at 45.9 grams per liter, plutonium at 2.43 grams per liter and nitric acid at 4.8 grams per liter is introduced at distributor inlet 13 at a rate of 27.5 gallons per minute and pulsed at an amplitude of approximately 2 inches and frequency of approximately 60 cycles per minute.

Simultaneously an aqueous liquid containing nitric acid at 6.3 grams per liter and a plutonium reducing agent is introduced at distributor 12 at a rate of 2.4 gallons per minute.

Organic liquid containing uranium at 46.2 grams per liter and nitric acid at 2.8 grams per liter is removed at outlet 11 at the top of the disengaging section at a rate of 27.3 gallons per minute, while aqueous liquid containing plutonium at 15.0 grams per liter, nitric acid at 102.7 grams per liter, and uranium at 13.1 grams per liter is removed at outlet 14 at a rate of 2.6 gallons per minute.

In this example, the plutonium transfers from a large volume organic phase to a small volume aqueous phase which would result in a nuclear criticality in the column if the column was not geometrically favorable.

Various modifications, alternatives, and improvements should become obvious to skilled artisans without departing from the spirit and scope of the invention set forth in the following claims:

We claim:

1. A pulsed solvent extraction column for processing fissile materials having a vertically disposed annular column processing section, a removable array of a plurality of plates spaced at intervals within said annular column processing section and an annular disengaging section, said annular column processing section being bounded by a removable internal cylinder and an external cylinder, said internal cylinder containing a liquid solution of a neutron absorbing or moderating material maintained at a higher hydrostatic pressure than the processing fluid in said annular column processing section whereby, in the event of leakage, the liquid solution of neutron absorbing or moderating material will flow into the annular processing section, thereby decreasing the possibility of displacement of the liquid in the internal cylinder by fissile solutions.

2. The solvent extraction column of claim 1 wherein said neutron absorbing or moderating material is selected from aqueous solutions of the group consisting of compounds of cadmium, boron, and gadolinium, said solution being adapted to decrease the possibility of nuclear criticality.

3. The solvent extraction column of claim 1 wherein said column is vertically disposed and said annular disengaging section is at the top of said column.

4. The solvent extraction column of claim 1 wherein said column is vertically disposed and said annular disengaging section is at the bottom of said column.

5. The solvent extraction column of claim 4 wherein a second annular disengaging section is at the top of said column.

* * * * *